(12) United States Patent
Park et al.

(10) Patent No.: US 12,147,535 B2
(45) Date of Patent: Nov. 19, 2024

(54) APPARATUS AND METHOD FOR TOLERATING BYZANTINE FAULTS IN BLOCKCHAIN PLATFORMS

(71) Applicant: POSTECH Research and Business Development Foundation, Pohang-si (KR)

(72) Inventors: Chanik Park, Pohang-si (KR); Jeong Hyeon Ma, Ansan-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 462 days.

(21) Appl. No.: 17/473,954

(22) Filed: Sep. 13, 2021

(65) Prior Publication Data

US 2022/0083656 A1 Mar. 17, 2022

(30) Foreign Application Priority Data

Sep. 14, 2020 (KR) .................. 10-2020-0117921
May 25, 2021 (KR) .................. 10-2021-0066732

(51) Int. Cl.
*G06F 21/55* (2013.01)
*G06F 11/07* (2006.01)
(Continued)

(52) U.S. Cl.
CPC .......... *G06F 21/554* (2013.01); *G06F 11/073* (2013.01); *G06F 11/0757* (2013.01);
(Continued)

(58) Field of Classification Search
None
See application file for complete search history.

(56) References Cited

U.S. PATENT DOCUMENTS 12,032,558 B2\* 7/2024 Zhang .................... G06Q 50/18
2019/0356469 A1\* 11/2019 Deshpande ........... H04L 9/0643
(Continued)

FOREIGN PATENT DOCUMENTS

KR 102002509 B1 7/2019

OTHER PUBLICATIONS

Zhang et al., "Consensus Mechanisms and Information Security Technologies" discloses electing a ordering service; 2019; retrieved from the internet https://www.dre.vanderbilt.edu/~schmidt/PDF/CH0007_Deka_v8.pdf; pp. 1-22 as printed. (Year: 2019).\*
(Continued)

*Primary Examiner* — Michael W Chao
(74) *Attorney, Agent, or Firm* — Morgan, Lewis & Bockius LLP

(57) ABSTRACT

A Byzantine fault tolerance method in a blockchain platform, which is related to an audit transaction analysis method for analyzing operation of a blockchain ordering service, may comprise: determining, through an audit transaction analysis submitted by each blockchain node included in at least one received block, a consensus level of the received block; and detecting a malfunction and a malicious attack of an ordering service on the basis of a consensus level update delay time and an error analysis of an audit transaction analysis process in the blockchain node.

6 Claims, 9 Drawing Sheets

(51) Int. Cl.
*G06F 16/23* (2019.01)
*H04L 9/00* (2022.01)

(52) U.S. Cl.
CPC ........ *G06F 11/079* (2013.01); *G06F 16/2379* (2019.01); *H04L 9/50* (2022.05); *G06F 2221/034* (2013.01)

(56) References Cited

U.S. PATENT DOCUMENTS

| | | | |
|---|---|---|---|
| 2019/0356470 A1* | 11/2019 | Deshpande | H04L 63/123 |
| 2019/0356674 A1* | 11/2019 | Irazabal | H04L 63/102 |
| 2021/0073212 A1* | 3/2021 | Conley | H04L 9/3213 |
| 2021/0135847 A1* | 5/2021 | Manevich | G06F 16/9014 |
| 2021/0217004 A1* | 7/2021 | Cai | G06Q 20/3829 |
| 2021/0273993 A1* | 9/2021 | Shirley | H04L 67/10 |
| 2022/0021711 A1* | 1/2022 | Marsh | H04L 9/3247 |
| 2022/0270725 A1* | 8/2022 | DeRosa-Grund | G06F 16/2365 |

OTHER PUBLICATIONS

Hyperledger "Hyperle hyperledger-fabricdocs Documentation", Release master, Sep. 2, 2020, pp. 1-363.

* cited by examiner

APPARATUS AND METHOD FOR TOLERATING BYZANTINE FAULTS IN BLOCKCHAIN PLATFORMS

CROSS-REFERENCE TO RELATED APPLICATIONS

This application claims priority to Korean Patent Application No. 10-2020-0117921 filed on Sep. 14, 2020 and No. 10-2021-0066732 filed on May 25, 2021 with the Korean Intellectual Property Office (KIPO), the entire content of each of which is hereby incorporated by reference.

BACKGROUND

1. Technical Field

Exemplary embodiments of the present disclosure relate to a method of tolerating Byzantine faults in blockchain platforms, and more particularly to a method of tolerating Byzantine faults in an ordering service responsible for generating and propagating blocks through functional expansion of blockchain nodes. The present disclosure is applicable to any blockchain platform that provides an ordering service.

2. Related Art

In general, a blockchain platform consists of nodes that provide ordering services and nodes that provide smart contracts and ledger services. Nodes that provide ordering services determine the order of transactions submitted by a client through a consensus protocol, group the transactions into blocks, and deliver the blocks to nodes that provide smart contracts and ledger services. Nodes that provide smart contracts and ledger services are called blockchain nodes and provide information about smart contract execution results and ledgers to a client according to a transaction execution order created by an ordering service. That is, a ledger and state information that are maintained and managed by a blockchain node is determined by a transaction execution order determined by an ordering service. Each service may be composed of multiple nodes using replication technology.

In a blockchain platform structure, safety issues may occur in smart contract execution and ledger management when the ordering service propagates inconsistent blocks to a blockchain node, and liveness issues may occur when an ordering service does not propagate blocks to a blockchain node. This means that it is no longer possible to correctly provide a service to clients who use the blockchain platform.

Hyperledger Fabric is a representative platform among blockchain platforms and is most often used in enterprise environments. Hyperledger Fabric consists of an ordering service and a peer. A client submits transactions to the ordering service, and the ordering service determines the order of the transactions provided by the client, groups the transactions into blocks, and delivers the blocks to the peer. Subsequently, the peer updates the ledger and state information using the block received from the ordering service and delivers the result to the client. Such a structure is a structure in which safety and liveness issues may occur due to a malicious attack or malfunction of the ordering service. Therefore, Hyperledger Fabric assumes that the ordering service is operating correctly.

Byzantine Fault Tolerance (BFT) technology is a technology that can tolerate malicious activity or malfunction of any node in a distributed node environment and that can correctly replicate states between nodes. Among the technologies, Practical Byzantine Fault Tolerance (PBFT) is the most representative. In the PBFT technology, nodes are largely divided into one primary node and replica nodes. The primary node determines the order of data to be updated and propagates the data and the order to the replica nodes. When a replica node receives the data and the order from the primary node, the replica node compares the data and the order to information received from other replica nodes and then updates the state with the data and the order when the data matches the information (a data matching process). If the information received by the replica nodes does not match the data, the primary node is replaced with another node (a primary node change process). In order to operate the protocol correctly in the PBFT technology, when the total number of nodes is n and the maximum number of tolerable defective nodes is f, f, which is the number of defective nodes, has to be less than $1/3$ of n, which is the total number of nodes. Also, at least $2/3$ of a total number n of nodes have to agree on the data consistency check process and the primary node change process.

SUMMARY

Accordingly, exemplary embodiments of the present disclosure are provided to substantially obviate one or more problems due to limitations and disadvantages of the related art.

Exemplary embodiments of the present disclosure provide a Byzantine fault tolerance apparatus and method in a blockchain platform corresponding to a blockchain node in order to solve safety or liveness issues that may occur due to an incorrect operation of an ordering service in the blockchain platform.

Conventional blockchain platforms aim to properly operate an ordering service itself in order to solve safety or liveness issues that may occur due to the ordering service. For example, the ordering service is configured using multiple nodes, and replication technology is applied based on a random consensus protocol. However, with the above structure, in an environment where multiple nodes of the ordering service can be maliciously operated or hacked, blockchain nodes can no longer trust the ordering service.

The present disclosure responds by expanding the function of the blockchain node considering that the ordering service may be malicious or malfunction. The expanded blockchain node audits the ordering service and changes the ordering service to a new ordering service when detecting a malicious attack or malfunction of the ordering service. Through such a method, the present disclosure intends to solve an issue that may occur due to an operation in which a blockchain node in the conventional blockchain platform depends on the ordering service.

According to an exemplary embodiment of the present disclosure for achieving the above-described objective, in a Byzantine fault tolerance apparatus in a blockchain platform that audits operation of a blockchain ordering service, wherein upon receiving a block, a blockchain node may generate an audit transaction and submits the audit transaction to a current ordering service.

The audit transaction may comprise the height of the block, a hash value of the block, identification information of the current ordering service, and an identity of the blockchain node on the basis of blockchain information held by the blockchain node.

The audit transaction may be generated in a period in which the blockchain node audits the current ordering service, and the period may be determined based on the number of blocks received from the current ordering service.

According to another exemplary embodiment of the present disclosure for achieving the above-described objective, a Byzantine fault tolerance method in a blockchain platform, which is related to an audit transaction analysis method for analyzing operation of a blockchain ordering service, may comprise: determining, through an audit transaction analysis submitted by each blockchain node included in at least one received block, a consensus level of the received block; and detecting a malfunction and a malicious attack of an ordering service on the basis of a consensus level update delay time and an error analysis of an audit transaction analysis process in the blockchain node.

The operation of determining, through an audit transaction analysis submitted by each blockchain node included in at least one received block, a consensus level of the received block may be a block consensus level determination method for interpreting an audit transaction for a block with a greater block height, which is among two blocks connected by the hash chain, as an audit transaction for a block with a lower block height by utilizing a feature in which all blocks in a blockchain architecture are connected by a hash chain.

The operation of detecting a malfunction and a malicious attack of an ordering service on the basis of a consensus level update delay time and an error analysis of an audit transaction analysis process in the blockchain node may further comprise detecting safety, liveness, and fairness violations due to an attack of an ordering service, the detection of the safety violation may determine that blockchain nodes submit audit transactions with different hash values for a block with the same height in a blockchain, the detection of the liveness violation may determine that a consensus level of a block is not updated for a finitely set period of time, and the detection of the fairness violation may determine that the number of audit transactions confirmed in blocks located within the same range in the blockchain is unbalanced among the blockchain node.

According to yet another exemplary embodiment of the present disclosure for achieving the above-described objective, a Byzantine fault tolerance method in a blockchain platform, which is related to a method of a blockchain node changing a blockchain ordering service when an ordering service malfunction is confirmed, may comprise: allowing a blockchain node to generate a change request message proposing a change of the ordering service and propagate the change request message to other blockchain nodes; analyzing a change request message from each blockchain node and generating and submitting a change proposal transaction for a new ordering service to an ordering service to be changed when it is determined that a predetermined number or more of blockchain nodes make a consensus on the change; allowing the blockchain node to receive a block included in the change proposal transaction from the new ordering service and generate and submit an audit transaction for a change proposal consensus on a corresponding block; and allowing the blockchain node to analyze an audit transaction for a change proposal consensus submitted by each blockchain nodes included in the block received from the new ordering service and make a consensus on a change to the new ordering service.

The change request message may include information generated based on a block having a prepared height, which is the greatest block height, among blocks with a "prepared" consensus level, and the information generated based on the block having the prepared height may include identification information on the new ordering service, identification information of an ordering service being currently provided, a prepared height, a hash value of a block located at a prepared height, a subsequent block information list including audit transactions of other blockchain nodes necessary to verify the "prepared" consensus level of the corresponding block, and an identity of the blockchain node.

The change proposal transaction may comprise identification information of the new ordering service, a set of change request messages received from other blockchain nodes, identification information of the latest ordering service among the received change request messages, the greatest prepared height information confirmed by the latest ordering service, a hash value of a block located at the greatest prepared height, a subsequent block list including audit transactions of the blockchain nodes for verification of the greatest prepared height, information on a blockchain state generated in consideration of even a block with the greatest prepared height, and an identity of the blockchain node.

The audit transaction for the change proposal consensus may comprise a height of the block, a hash value of the block, service identification information of the current ordering service, location offset information of the change proposal transaction in the block, and an identity of the blockchain node.

The Byzantine fault tolerance method may further comprise operations of: interpreting an audit transaction for a block with a greater block height, which is of two blocks connected by a hash chain, as an audit transaction for a block with a lower block height, and determining a consensus level of a block including the change proposal transaction, which is an audit transaction analysis method for a change proposal consensus determined by interpreting the audit transactions in units of location offset information of a valid change proposal transaction determined by each blockchain node.

The Byzantine fault tolerance method may further comprise applying an audit unit and a change unit to Hyperledger Fabric, which is a Byzantine fault tolerance method for the ordering service in Hyperledger Fabric interoperating with a conventional module in a peer node of Hyperledger Fabric.

According to yet another exemplary embodiment of the present disclosure for achieving the above-described objective, a computer program stored in a computer-readable recording medium for implementing the Byzantine fault tolerance method in a blockchain platform may be provided.

According to yet another exemplary embodiment of the present disclosure for achieving the above-described objective, a computer-readable recording medium for implementing a program of the Byzantine fault tolerance method in a blockchain platform may be provided.

With the BFT apparatus and method in the blockchain platform according to the present disclosure, it is possible to cope with safety and liveness issues of the ordering service even in an environment where the maximum number of tolerable faulty blockchain nodes is f on the basis of PBFT.

The above-described feature of the BFT apparatus and method in the blockchain platform according to the present disclosure is that the method is the first disclosure to tolerate a fault of the ordering service in the blockchain platform.

Also, when two blocks connected by a hash chain are given, advantageously, it is possible to reduce the audit and change costs of the blockchain node by utilizing the hash chain property of a blockchain, i.e., a property in which there is only one hash chain path.

Also, the change of the ordering service is not carried out mainly by a specific blockchain node, but advantageously, each node generates a change request message and a change proposal transaction and makes a consensus on a change proposal transaction independently to operate in a decentralized form.

BRIEF DESCRIPTION OF DRAWINGS

Exemplary embodiments of the present disclosure will become more apparent by describing exemplary embodiments of the present disclosure in detail with reference to the accompanying drawings, in which.

DETAILED DESCRIPTION OF THE EMBODIMENTS

Figure 1:
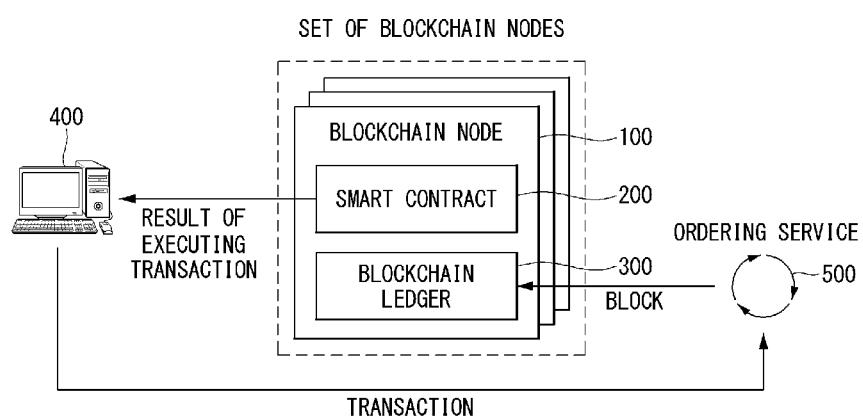
FIG. 1 is a configuration diagram showing a system of a general blockchain platform.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

To utilize the Practical Byzantine Fault Tolerance (PBFT) algorithm, in the following description, the total number of blockchain nodes is n, and the maximum number of tolerable faulty blockchain nodes is f.

FIG. 1 is a configuration diagram of a system of a general blockchain platform.

As shown in FIG. 1, for the configuration of the system of the blockchain platform, a blockchain node 100 is a node that provides a smart contract service 200 and a blockchain ledger 300 to a client 400, and an ordering service 500 is a service that provides a block to the blockchain node.

The overall execution flow of the system of the blockchain platform is as follows.

First, the client 400 submits a transaction to the ordering service 500. The ordering service 500 determines an execution turn of the transaction, groups the transaction and the turn into a block, and propagates the block to the blockchain node 100. The propagated block is recorded in the blockchain ledger 300 of the blockchain node 100. The smart contract 200 is executed based on the transaction turn in the block, and then the execution result is delivered to the client 400.

Figure 2:
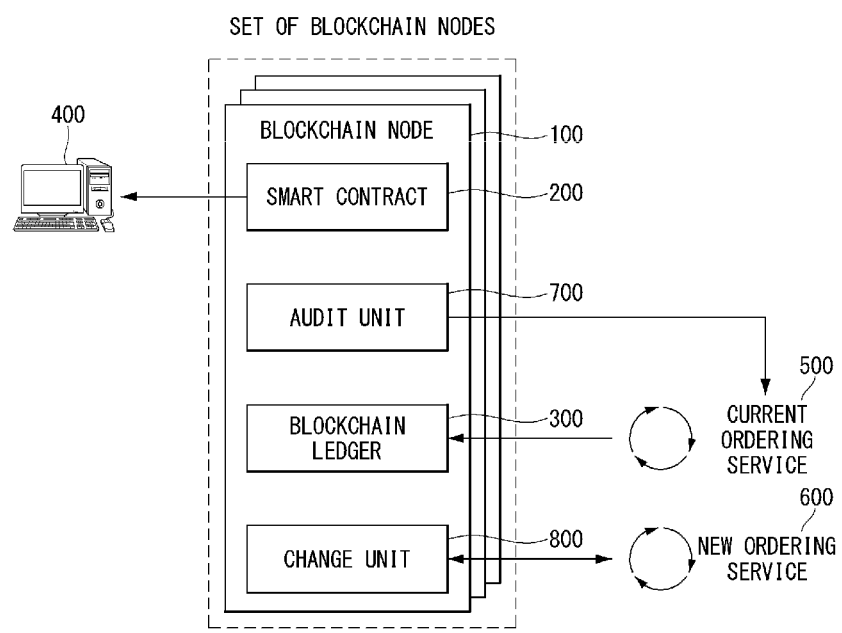
FIG. 2 is a configuration diagram showing an overall system of a Byzantine Fault Tolerance (BFT) apparatus for a blockchain platform according to an embodiment of the present disclosure.
Figure 3:
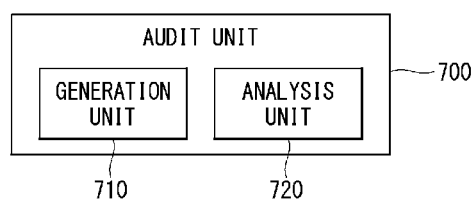
FIG. 3 is a configuration diagram showing an audit unit of a BFT apparatus for a blockchain platform according to an embodiment of the present disclosure.
Figure 4:
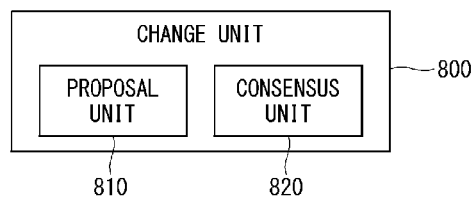
FIG. 4 is a configuration diagram of a change unit of a BFT apparatus for a blockchain platform according to an embodiment of the present disclosure.

FIG. 2 is a configuration diagram of an overall system of a Byzantine Fault Tolerance (BFT) apparatus for a blockchain platform according to an embodiment of the present disclosure, FIG. 3 is a configuration diagram showing an audit unit, and FIG. 4 is a configuration diagram of a change unit.

As shown in FIG. 2, for the configuration of the system of the BFT apparatus for the blockchain platform of the present disclosure, a blockchain node 100 has a blockchain node 100, a smart contract 200 that provides a smart contract service, and a blockchain ledger 300 that contains a series of blocks received from an ordering service, like the general blockchain platform of FIG. 1.

The BFT apparatus for the blockchain platform of the present disclosure supports Byzantine fault tolerance of ordering services 500 and 600 by additionally employing an audit unit 700 and a change unit 800 for tolerating Byzantine faults of the ordering services 500 and 600 in the above-described configuration of FIG. 1.

The ordering services 500 and 600 include an ordering service 500 which is currently used and from which the blockchain node 100 receives the current service and an ordering service 600 which is to be newly used when an incorrect operation of the current ordering service 500 is detected.

The audit unit 700 of the blockchain node 100 includes a generation unit 710 that generates information for auditing an operation of the current ordering service 500 and an analysis unit 720 that analyzes an operation of the ordering service on the basis of audit information generated by each blockchain node 100.

The information generated by the generation unit 710 includes a transaction including the height of a block, a hash value of a block, identification information of the current ordering service 500, and the identity of a blockchain node 100 that receives a block, which are based on blockchain information that is held by the blockchain node 100 therein to audit the current ordering service 500. Here, this transaction is called an audit transaction, and the audit transaction is individually generated by the blockchain node 100 that receives a block and is submitted to the current ordering service 500.

The audit transaction is information for a blockchain node 100 notifying other blockchain nodes 100 of blockchain information held by the blockchain node 100. The audit transaction is generated in a period in which the blockchain node 100 audits the current ordering service 500, and the period is determined based on the number of blocks received from the current ordering service 500. That is, the audit transaction may be generated whenever a block is received or may be generated when multiple blocks are generated.

The blockchain node 100 submits the generated audit transaction to the current ordering service 500. The submitted audit transaction is ordered along with normal transactions by the current ordering service 500, is generated as a block, and is propagated to the blockchain node 100.

The analysis unit 720 extracts and analyzes the audit transaction included in the received block and increases the consensus level of blocks included in the blockchain ledger 300 on the basis of whether the blockchain nodes 100 have observed the same blocks. The consensus levels of the blocks are classified into "none," "prepared," and "committed" on the basis of the Practical Byzantine Fault Tolerance (PBFT).

The "none" consensus level is a state in which a block is connected to a blockchain ledger but the turn of the corresponding block cannot be guaranteed.

When n-f or more blockchain nodes 100 observe a block with the same "none" consensus level, the state is switched into the "prepared" consensus level.

When n-f or more blockchain nodes 100 observe a block with the same "prepared" consensus level, the state is switched into the "committed" consensus level.

In addition, it is assumed that two arbitrary blocks connected by a hash chain are given. In this case, when two blocks with an arbitrary block height g and a block height g' higher than the block height g are connected by a hash chain by utilizing the hash chain property of a blockchain, i.e., a property in which there is only one hash chain path, an arbitrary blockchain node 100 observing the blockchain height g' may be regarded as the blockchain node 100 observing the blockchain height g as well. Therefore, the consensus level of the block with the specific block height g may be switched by using an audit transaction including the block height g and an audit transaction including the block height g' higher than the block height g.

The analysis unit 720 analyzes an incorrect operation of the current ordering service 500 in terms of safety, liveness, and fairness on the basis of the above description.

A safety violation corresponds to a case in which the blockchain nodes 100 observe different hash values for blocks with the same height in a blockchain.

A liveness violation corresponds to a case in which the consensus level of a block is not updated for a finitely set period of time. A liveness violation is detected by timeout.

A fairness violation corresponds to a case in which the number of audit transactions confirmed in blocks located within the same range in a blockchain is unbalanced between blockchain nodes 100.

When a malfunction of the current ordering service 500 is confirmed, the change unit 800 performs a process of changing the ordering service.

A proposal unit 810 generates a change request message proposing a change of the ordering service and propagates the change request message to other blockchain nodes 100. Also, the proposal unit 810 analyzes a change request message received from another blockchain node 100. When the proposal unit 810 determines that a certain number or more of blockchain nodes 100 agree to the change, the proposal unit 810 generates a change proposal transaction for a new ordering service 600 and submits the change proposal transaction to the new ordering service 600. A consensus unit 820 analyzes an audit transaction for a change proposal consensus submitted by blockchain nodes 100 included in a block received from the new ordering service 600 and agrees to a change to the new ordering service 600.

The proposal unit 810 generates an ordering service change request message on the basis of a block with the greatest block height among blocks with the "prepared" consensus level among a series of blocks present in the blockchain ledger 300 held by the blockchain node 100 and propagates the ordering service change request message to other blockchain nodes 100. Hereinafter, the greatest block height of the block among the blocks with the "prepared"

consensus level in one blockchain node 100 is referred to as a prepared height. Blockchain nodes 100 may have different prepared heights.

The change request message of the blockchain node 100 includes identification information of the new ordering service 600, identification information of the current ordering service 500, a prepared height, a hash value of a block located at a prepared height, a subsequent block information list including audit transactions of other blockchain nodes 100 necessary to verify "prepared," which is the consensus level of the corresponding block, and the identity of the blockchain node 100.

When the blockchain node 100 receives more than n-f change request messages from other blockchain nodes 100 that have detected incorrect operations of the current ordering service 500, the blockchain node 100 generates a change proposal transaction and submits the change proposal transaction to the new ordering service 600.

The change proposal transaction includes identification information of the new ordering service 600, a set of (more than n-f) change request messages received from other blockchain nodes 100, identification information of the latest ordering service among the received change request messages, the greatest prepared height information confirmed by the latest ordering service, a hash value of a block located at the greatest prepared height, a subsequent block list including audit transactions of the blockchain nodes 100 for verification of the greatest prepared height, information on a blockchain state 950 generated in consideration of even a block with the greatest prepared height, and the identity of the blockchain node 100, and is configured in the form of a transaction.

When a change proposal transaction submitted by the proposal unit 810 of the arbitrary blockchain node 100 is generated as a block in the new ordering service 600 and propagated to blockchain nodes 100, the consensus unit 820 extracts and verifies the change proposal transaction to find a first valid change proposal transaction.

When the first valid change proposal transaction is found, the consensus unit 820 submits, to the new ordering service 600, an audit transaction to which location offset information for the first valid change proposal transaction is added for the change proposal consensus. That is, the audit transaction for the change proposal consensus includes the height of a block, a hash value of a block, the new ordering service 600, identification information, location offset information for a change proposal transaction in a block, and the identity of the blockchain node 100.

The new ordering service 600 generates audit transactions for the change proposal consensus as a block and propagates the block to the blockchain node 100. Each blockchain node 100 interprets the audit transaction in units of the location offset information of the change proposal transaction and determines the consensus level of the block.

A process of determining the consensus level is the same as the analysis unit 720 of the audit unit 700. The consensus level of the block included in the first valid change proposal transaction is "committed," a local state is updated with information on a state 950 included in the change proposal transaction, and the ordering service change procedure is terminated.

Figure 5:
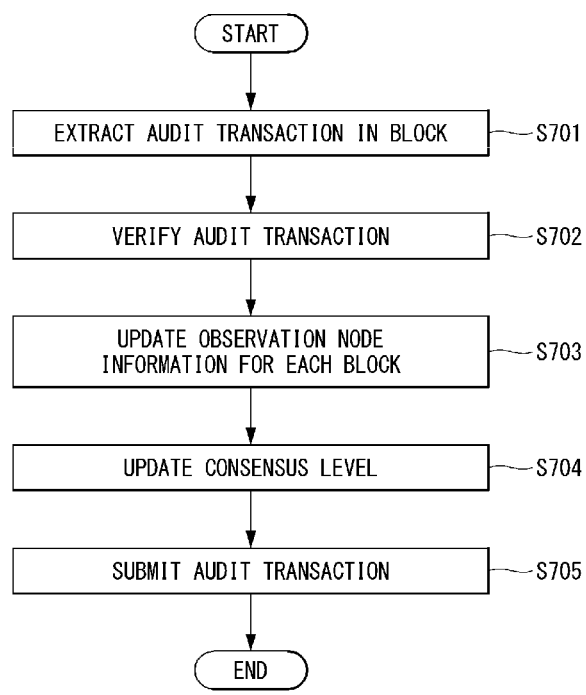
FIG. 5 is a flowchart illustrating the generation and analysis of an audit transaction to audit an ordering service according to an embodiment of the present disclosure.

FIG. 5 is a flowchart illustrating the generation and analysis of an audit transaction to audit the current ordering service 500 of a BFT method in a blockchain platform according to an embodiment of the present disclosure.

Referring to FIG. 5, the BFT method in the blockchain platform according to an embodiment of the present disclosure includes operations S701 to S705 for the generation and analysis of an audit transaction to audit a current ordering service 500.

A blockchain node 100 extracts an audit transaction in a block generated by the current ordering service 500 (S701). The audit transaction includes information on blocks observed by each blockchain node 100 and is signed with a private key of each blockchain node 100. That is, any blockchain node 100 cannot arbitrarily generate information observed by other blockchain nodes 100.

In an audit transaction verification operation, the blockchain node 100 checks signature information and whether a hash value of a block observed by the blockchain node 100 and a hash value of a block observed by another blockchain node 100 match each other (S702).

Subsequently, the blockchain node 100 updates observation node information of blocks having smaller heights than that of the block included in the audit transaction (S703).

When the observation node information of the blocks corresponds to a consensus level update condition, the blockchain node 100 updates the consensus level of the blocks (S704).

The blockchain node 100 submits an audit transaction corresponding to a block currently being analyzed to the current ordering service (S705).

The audit transaction is generated as a new block by the current ordering service 500 and propagated to the blockchain node 100, and the blockchain node 100 repeats the same process starting from step S701 upon receiving the new block.

Figure 6:
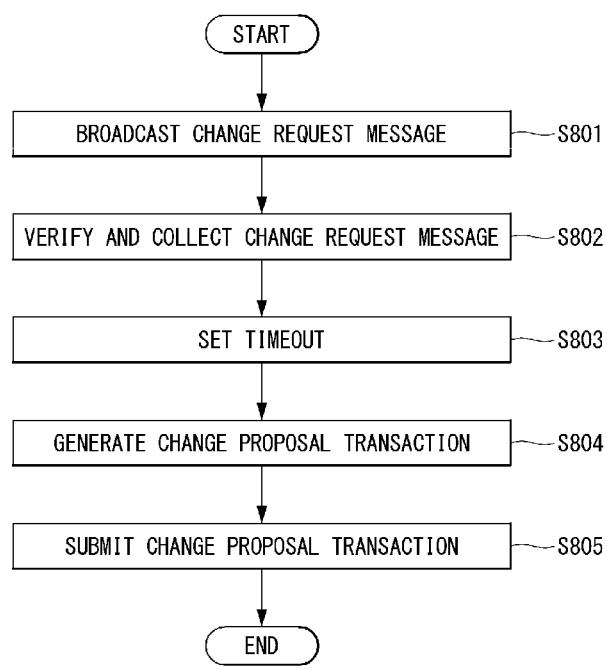
FIG. 6 is a flowchart illustrating the generation and submission of a change proposal transaction for changing an ordering service according to an embodiment of the present disclosure.

FIG. 6 is a flowchart illustrating the generation and submission of a change proposal transaction to change an ordering service of a BFT method in a blockchain platform according to an embodiment of the present disclosure.

Referring to FIG. 6, the BFT method in the blockchain platform according to an embodiment of the present disclosure includes operation S801 to S805 for the generation and submission of a change proposal transaction to changing an ordering service.

When an ordering service changing procedure is started, the blockchain node 100 generates a change request message and propagates the change request message to other blockchain nodes 100 (S801). The change request message is generated based on a prepared height of the blockchain node 100 and is signed with a private key of the blockchain node 100.

The blockchain node 100 receives change request messages generated in the same manner as that of the blockchain node 100 from other blockchain nodes 100 and verifies and collects the received change request messages (S802). The verification is to check signature information of a change request message and whether the consensus level of the block corresponding to the prepared height is "prepared." When audit transactions submitted by n-f or more blockchain nodes 100 are in a subsequent block list, the verification process for the change request message is completed.

When n-f or more valid change request messages are collected, the blockchain node 100 sets a timeout (S803). This is because liveness issues may occur in the new ordering service 600.

Subsequently, the blockchain node 100 generates a change proposal transaction (S804). The change proposal transaction is generated based on the greatest prepared height among prepared heights seen by the n-f or more nodes. The change proposal transaction includes all evidence as to whether to resume the blockchain in the new ordering service 600 based on information on which state 950 the blockchain is in.

When the blockchain node 100 generates the change proposal transaction, the blockchain node 100 submits the change proposal transaction to the new ordering service 600 (S805).

Figure 7:
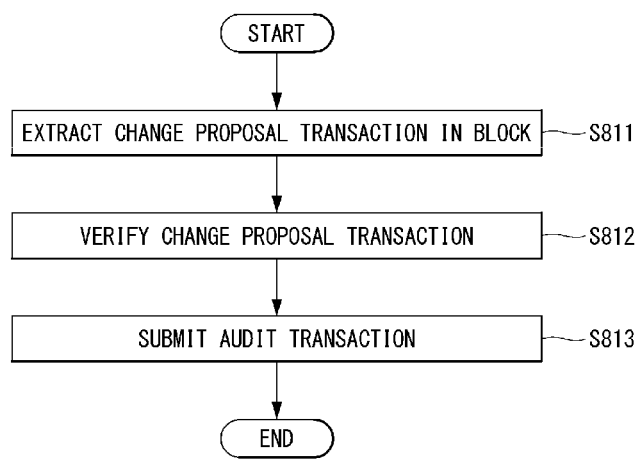
FIG. 7 is a flowchart illustrating the reception of a change proposal transaction and the submission of an audit transaction for the change proposal transaction according to an embodiment of the present disclosure.

FIG. 7 is a flowchart illustrating the reception of a change proposal transaction and the submission of an audit transaction for the change proposal transaction in a BFT method in a blockchain platform according to an embodiment of the present disclosure.

Referring to FIG. 7, the BFT method in the blockchain platform according to an embodiment of the present disclosure includes operations S811 to S813 for the reception of a change proposal transaction and the submission of an audit transaction for the change proposal transaction.

When a block generated in the new ordering service 600 is received, the blockchain node 100 extracts a change proposal transaction in the block (S811).

The blockchain node 100 verifies the extracted change proposal transaction (S812). The extraction and verification of the change proposal transaction are performed until the blockchain node 100 finds a first valid change proposal transaction.

When the first valid change proposal transaction is found, the blockchain node 100 submits, to the new ordering service, an audit transaction to which location offset information in a blockchain of the change proposal transaction is added (S813).

Figure 8:
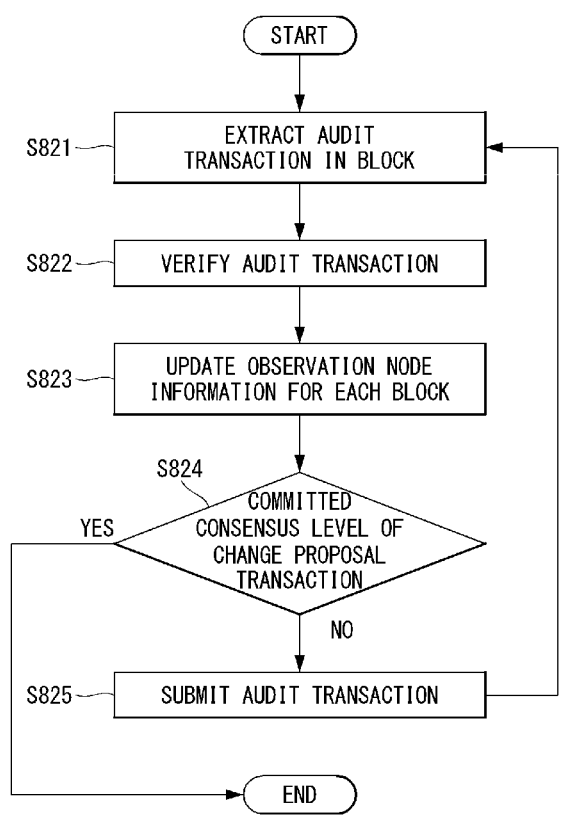
FIG. 8 is a flowchart illustrating a consensus on a change proposal transaction according to an embodiment of the present disclosure.

FIG. 8 is a flowchart illustrating a consensus on a specific change proposal transaction in a BFT method in a blockchain platform according to an embodiment of the present disclosure.

Referring to FIG. 8, the BFT method in the blockchain platform according to an embodiment of the present disclosure includes operations S821 to S825 for the consensus on the specific change proposal transaction.

When a blockchain node 100 receives a block generated by the new ordering service 600, the blockchain node 100 extracts an audit transaction for a consensus on a change proposal transaction (S821).

The blockchain node 100 verifies the extracted audit transaction (S822).

Subsequently, the blockchain node 100 updates observation node information of blocks having smaller heights than that of the block included in the audit transaction (S823). In this case, for each block, the observation node information is updated by classifying location offset information in the blockchain of the first valid change proposal transaction observed by the blockchain nodes 100.

Here, the change procedure to the new ordering service 600 is terminated when the consensus level of the block including the first valid change proposal transaction is "committed" (S824); otherwise, the blockchain node 100 submits an audit transaction in addition to information on a currently analyzed block (the height of the block and the hash of the block) and location offset information in the blockchain of the first valid change proposal transaction confirmed by the blockchain node 100 (S825).

Subsequently, the blockchain node 100 analyzes the audit transaction included in the subsequent block and repeats operations S821 to S825 until the consensus level of the block including the first valid change proposal transaction is "committed."

Figure 9:
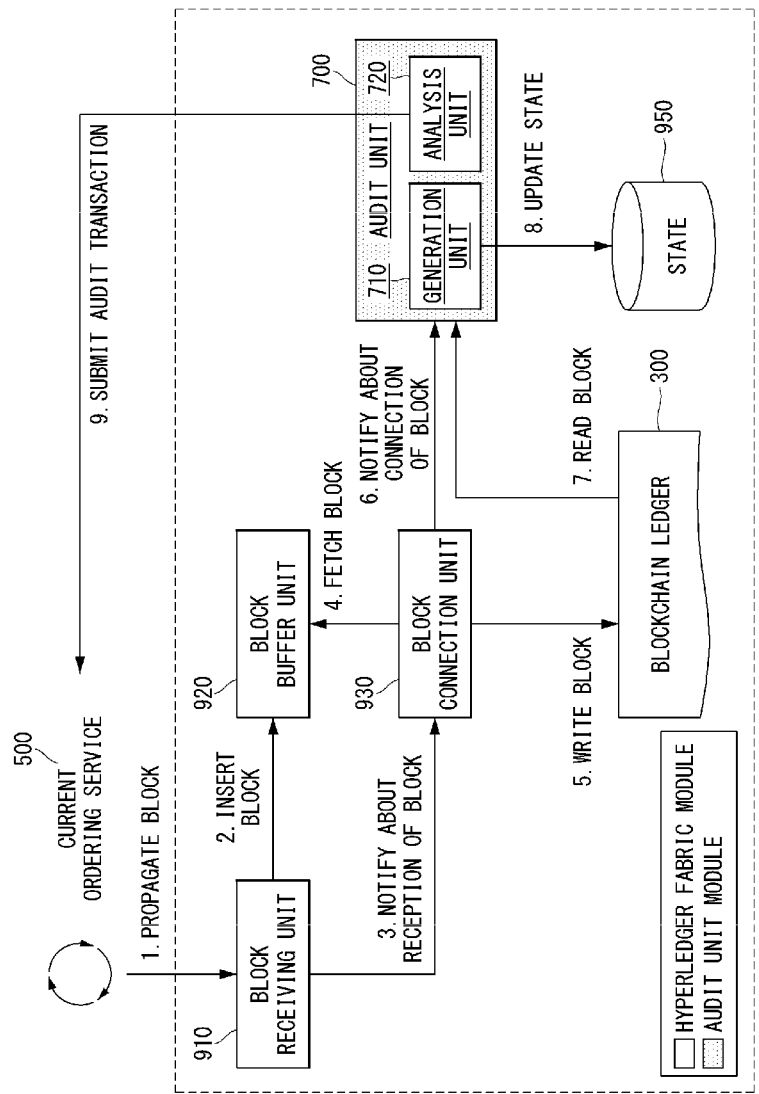
FIG. 9 is a diagram in which an audit unit is applied to Hyperledger Fabric according to an embodiment of the present disclosure.

FIG. 9 is a diagram in which an audit unit 700 is applied to Hyperledger Fabric of a BFT apparatus in a blockchain platform according to an embodiment of the present disclosure.

Referring to FIG. 9, when a block receiving unit (block provider) 910 of a peer receives a block propagated from a current ordering service 500, the BFT apparatus in the blockchain platform according to an embodiment of the present disclosure inserts the received block into a block buffer unit (payload buffer) 920 and then notifies a block connection unit (committer) 930 that the block is received.

The block connection unit (committer) 930 sequentially fetches blocks inserted into the block buffer unit (payload buffer) 920, stores the blocks in a blockchain ledger 300, and then notifies an audit unit 700 of a block connection.

An analysis unit 720 of the audit unit 700 extracts an audit transaction in a block read from the blockchain ledger 300 and calculates the consensus level of the block on the basis of the extracted audit transaction. When the consensus level of the block is "committed," a state 950 is updated using the transaction information in the block.

Subsequently, a generation unit 710 of the audit unit 700 submits the audit transaction to the ordering service 500 using information on a block that is currently analyzed.

Figure 10:
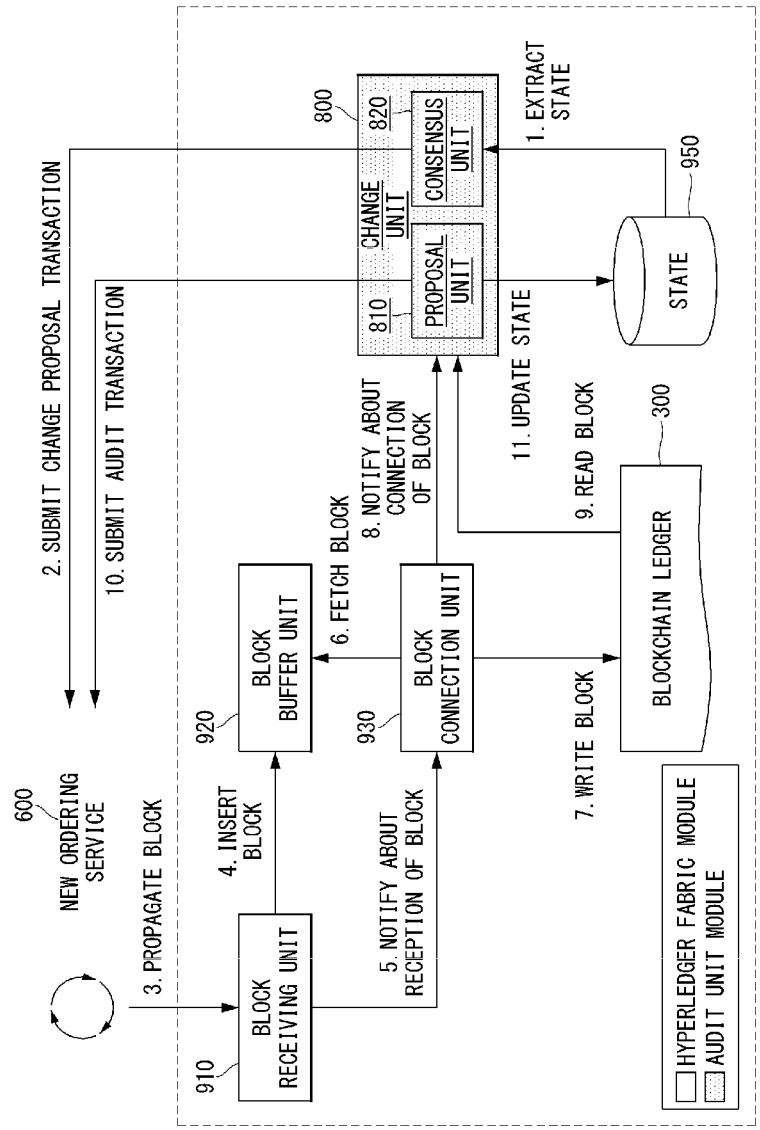
FIG. 10 is a diagram in which a change unit is applied to Hyperledger Fabric according to an embodiment of the present disclosure.

FIG. 10 is a diagram in which a change unit 800 is applied to Hyperledger Fabric of a BFT apparatus in a blockchain platform according to an embodiment of the present disclosure.

Referring to FIG. 10, when the proposal unit 810 of the change unit 800 of the BFT apparatus in the blockchain platform according to an embodiment of the present disclosure receives a sufficient change request message from other peers, the proposal unit 810 extracts a state 950, generates a change proposal transaction on the basis of the extracted state 950, and submits the change proposal transaction to a new ordering service 600.

The new ordering service 600 generates the change proposal transaction as a block and propagates the block to peers.

When a block receiving unit (block provider) 910 receives a block propagated from the new ordering service 600, the block receiving unit 910 inserts the block into a block buffer unit (payload buffer) 920 and then notifies a block connection unit (committer) 930.

The block connection unit (committer) 930 sequentially fetches blocks inserted into the block buffer unit (payload buffer) 920, stores the blocks in a blockchain ledger 300, and then notifies the change unit 800 of a block connection.

The consensus unit 820 of the change unit 800 submits an audit transaction to the new ordering service 600 when a valid change proposal transaction is found in a block read from the blockchain ledger 300.

The audit transaction is generated as a block by the new ordering service 600 and propagated to a peer.

The consensus unit 820 of the change unit 800 extracts an audit transaction in a block that is newly delivered and computes the consensus level of the block including the change proposal transaction on the basis of the extracted audit transaction.

When the consensus level of the block is "committed," a state is updated using information on a state 950 of the change proposal transaction in the block.

The configuration of the BFT apparatus in the blockchain platform according to an embodiment of the present disclosure will be described in terms of operation as follows.

The BFT apparatus in the blockchain platform according to an embodiment of the present disclosure is configured to expand the function of the blockchain node and tolerate a Byzantine fault in an ordering service. When the current ordering service propagates a block to a blockchain node, the blockchain node composes information on the block received by the blockchain node as a message, signs the message, and submits the message to the current ordering service. The current ordering service adds the message to anew block and propagates the new block to a blockchain node. The blockchain node compares block information received by the blockchain node and block information received by other blockchain nodes to detect a malfunction of the current ordering service. The blockchain node also determines a malfunction even when the current ordering service propagates no blocks for a finitely set period of time. When a blockchain node detects a malfunction of the current ordering service, the blockchain node exchanges its own blockchain ledger information with other blockchain nodes, generates a change proposal transaction by including state information to be started in the new ordering service and evidence on the state information on the basis of the blockchain ledger information, and submits the change proposal transaction to the new ordering service. Subsequently, blockchain nodes reach a consensus on the change proposal transaction, and the new ordering service resumes a blockchain service. The audit and change of the ordering service of the blockchain node are applied to a BFT protocol in units of a block.

The BFT method in the blockchain platform according to an embodiment of the present disclosure can cope with safety and liveness issues of the ordering service even in an environment where the maximum number of tolerable faulty blockchain nodes is f on the basis of the Practical Byzantine Fault Tolerance (PBFT).

The above-described feature of the BFT method in the blockchain platform according to the present disclosure is that the method is the first disclosure to tolerate a fault of the ordering service in the blockchain platform.

Also, when two blocks connected by a hash chain are given, advantageously, it is possible to reduce the audit and change costs of the blockchain node by utilizing the hash chain property of a blockchain, i.e., a property in which there is only one hash chain path.

Also, the change of the ordering service is not carried out mainly by a specific blockchain node, but advantageously, each node generates a change request message and a change proposal transaction and makes a consensus on a change proposal transaction independently to operate in a decentralized form.

The operations of the method according to an embodiment of the present disclosure can also be embodied as computer-readable programs or codes on a computer-readable recording medium. The computer-readable recording medium includes any type of recording apparatus in which data readable by a computer system is stored. The computer-readable recording medium can also be distributed over network-coupled computer systems so that computer-readable programs or codes are stored and executed in a distributed fashion.

Also, examples of the computer-readable recording medium may include a hardware device such as ROM, RAM, and flash memory, which are specifically configured to store and execute program commands. The program commands may include high-level language codes executable by a computer using an interpreter as well as machine codes made by a compiler.

Although some aspects of the disclosure have been described in the context of an apparatus, it is clear that these aspects also represent a description of the corresponding method, where a block or apparatus corresponds to a method step or a feature of a method step. Analogously, aspects described in the context of a method step may also represent a description of a corresponding block or item or feature of a corresponding apparatus. Some or all of the method steps may be performed by means of (or by using) a hardware device such as, for example, a microprocessor, a programmable computer, or an electronic circuit. In some embodiments, one or more of the most important method steps may be performed by such a device.

In some embodiments, a programmable logic device (for example, a field-programmable gate array) may be used to perform some or all of the functionalities of the methods described herein. In some embodiments, a field-programmable gate array may cooperate with a microprocessor in order to perform one of the methods described herein. Generally, the methods are performed by any hardware device.

While the exemplary embodiments of the present disclosure and their advantages have been described in detail, it should be understood that various changes, substitutions and alterations may be made herein without departing from the scope of the present disclosure.

What is claimed is:

1. A Byzantine fault tolerance method in a blockchain platform, which is related to a method of a blockchain node changing a blockchain ordering service when an ordering service malfunction is detected, the Byzantine fault tolerance method comprising operations of:

generating, by a blockchain node, a first audit transaction by auditing a first block generated by a current ordering service;

propagating, by the blockchain node, the first audit transaction to other blockchain nodes;

generating, by the blockchain node, a change request message proposing a change of the current ordering service and propagating the change request message to the other blockchain nodes when a malfunction and a malicious attack of the current ordering service has been detected based on the first audit transaction and a plurality of second audit transactions received from the other blockchain nodes;

analyzing, by the blockchain node, a change request message from each of the other blockchain nodes to generate and submit a change proposal transaction for a new ordering service to an ordering service to be changed when it is determined that a predetermined number or more of blockchain nodes make a consensus on the change;

receiving, by the blockchain node, a second block included in the change proposal transaction from the new ordering service and generating and submitting a third audit transaction for a change proposal consensus on the second block; and analyzing, by the blockchain node, a fourth audit transaction for a change proposal consensus submitted by each blockchain node included in the second block received from the new ordering service and making a consensus on a change to the new ordering service.

2. The Byzantine fault tolerance method of claim 1, wherein a change request includes information generated based on a block having a prepared height, which is the greatest block height, among blocks with a "prepared" consensus level, the change request is any of the change request message proposing the change or the change request message from each blockchain node, and the information generated based on the block having the prepared height includes identification information on the new ordering service, identification information of an ordering service being currently provided, the prepared height, a hash value of the block located at the prepared height, a subsequent block information list including audit transactions of the other blockchain nodes necessary to verify the "prepared" consensus level of the corresponding block, and an identity of the blockchain node.

3. The Byzantine fault tolerance method of claim 1, wherein the change proposal transaction comprises identification information of the new ordering service, a set of change request messages received from the other blockchain nodes, identification information of a latest ordering service among the received change request messages, the greatest prepared height information confirmed by the latest ordering service, a hash value of a block located at the greatest prepared height, a subsequent block list including audit transactions of the blockchain nodes for verification of the greatest prepared height, information on a blockchain state generated in consideration of a block with the greatest prepared height, and an identity of the blockchain node.

4. The Byzantine fault tolerance method of claim 1, wherein the audit transaction for the change proposal consensus comprises a height of a block, a hash value of a block, service identification information of the current ordering service, location offset information of the change proposal transaction in a block, and an identity of the blockchain node, and the audit transaction includes one or both of the third audit transaction and the fourth audit transaction.

5. The Byzantine fault tolerance method of claim 1, further comprising operations of: interpreting, by the blockchain node, an audit transaction for a block with a greater block height, which is of two blocks connected by a hash chain, as an audit transaction for a block with a lower block height, and determining a consensus level of a block including the change proposal transaction, which is an audit transaction analysis method for a change proposal consensus determined by interpreting the third and fourth audit transactions in units of location offset information of a valid change proposal transaction determined by each blockchain node.

6. The Byzantine fault tolerance method of claim 1, further comprising applying an audit unit and a change unit to Hyperledger Fabric, which is a Byzantine fault tolerance method for any one of a plurality of ordering service candidates in Hyperledger Fabric interoperating with a conventional module in a peer node of Hyperledger Fabric.

* * * * *